United States Patent Office 3,223,675
Patented Dec. 14, 1965

3,223,675
CURED CHLOROSULFONATED POLYETHYLENE
COMPOSITIONS
Thelma J. Brackbill, Manheim, Pa., assignor to Armstrong Cork Company, Lancaster, Pa., a corporation of Pennsylvania
No Drawing. Filed Sept. 19, 1962, Ser. No. 224,820
7 Claims. (Cl. 260—41)

This invention relates generally to flexible, hard-surface floor coverings. More particularly, the invention relates to a floor covering having exceptionally good abrasive resistance in use, and still more particularly, the invention relates to a rubber floor covering preferably in the form of a floor tile having exceptional abrasive resistance coupled with soil resistance.

It has been known that chlorosulfonated polyethylene rubber possesses unusually excellent abrasive resistance along with other highly desirable properties for use as a binder in a floor covering. However, the rubber has possessed one deficiency which has eliminated the possibility of its use as a binder in a floor covering. This deficiency relates to the soil resistance of the finished floor covering. The surface characteristics of a floor covering having chlorosulfonated polyethylene as a binder are such that an undue amount of soil is picked up on the surface of the floor covering. This extraordinary soiling is probably due both to the openness of the surface of the floor covering and to the chemical characteristics of that surface. The soiling is sufficiently pronounced to be apparent on mere casual inspection. Careful and continuous maintenance are required if floor coverings having a chlorosulfonated polyethylene rubber binder are to serve at all as a floor covering. Such costly maintenance is out of the question from a practical standpoint for most flooring installations. Accordingly, there has long been a need for a flooring composition having a chlorosulfonated polyethylene rubber binder system which preserves all the otherwise excellent properties of the rubber while having, in addition to these other properties, a useful soil resistance.

It is the primary object of the present invention to supply such a composition. It is another object of the present invention to present a floor covering composition wherein the excellent properties of chlorosulfonated polyethylene rubber are preserved, and even enhanced, while at the same time presenting an excellent soil resistance.

These objects are accomplished in a straightforward and effective manner. The invention contemplates a flexible, soil-resistant floor covering comprising a pigmented and plasticized composition containing 30–85% by weight inorganic fillers and 70–15% by weight of a binder system. The binder system includes a chlorosulfonated polyethylene rubber and poly(vinyl acetal) in an amount of 2–20 parts by weight of the acetal per 100 parts by weight of the chlorosulfonated polyethylene rubber.

The chlorosulfonated polyethylene rubber which serves as the binder in the present invention is a known item of commerce and is described in U.S. 2,586,363—McAlevy. In making the rubber, commercial ethylene polymer or interpolymer in solid form is treated to introduce both chlorine and sulphur. The polyethylene frequently used has a number average molecular weight of about 20,000.

The sulphur content of the chlorosulfonated polyethylene will generally run in the range of about 1.2–1.7% by weight sulphur, while the chlorine content will generally run about 24–40% by weight. Most of the chlorine is substituted directly on the hydrocarbon chain of the polyethylene, while the sulphur is generally combined with the chlorine and attached to the chain as sulfonyl chloride groups. Generally speaking, there will be about 1 chlorine atom for every 6 or 7 carbon atoms, and 1 sulfonyl chloride group for every 90 to 130 carbon atoms. Although the chlorosulfonated polyethylene rubber is vulcanizable, such vulcanization, also referred to as curing or cross-linking, has not produced a surface which resists the accumulation of soil and dirt when the rubber is used in the binder system of floor coverings. This is true even though the rubber has been compounded with the usual fillers, metallic oxides to serve as pigments, fillers, curing agents, and acid acceptors, accelerators, plasticizers, stabilizers, and pigments.

Poly(vinyl acetal) resin is the composition which cures the chlorosulfonated polyethylene rubber and imparts to the resulting surface of the composition containing the rubber the needed soil-resistant properties. Poly(vinyl acetals) are prepared from aldehydes and poly(vinyl alcohols). Poly(vinyl alcohols) are prepared from poly(vinyl acetates) by hydrolyzing the acetate group in order to replace it with a hydroxyl group. The poly(vinyl alcohols) are normally classified as partially hydrolyzed containing 15–30% poly(vinyl acetate) groups, and completely hydrolyzed containing 0–5% poly(vinyl acetate) groups. Both the partially hydrolyzed and completely hydrolyzed poly(vinyl alcohols) are used in producing the commercial poly(vinyl acetals). One molecule of a suitable aldehyde reacts with 2 hydroxyls in the poly(vinyl alcohol) molecule to form the acetal. The aldehydes used are the lower aliphatic aldehydes containing 1–4 carbon atoms such as formaldehyde, acetaldehyde, propionaldehyde, and butylaldehyde. The poly(vinyl acetals) are frequently named according to the particular aldehyde used in its manufacture. For example, poly(vinyl formal) is the acetal made with formaldehyde, and poly(vinyl butyral) is the acetal made from butylaldehyde. The poly(vinyl acetals) themselves are solid resins, and in all of them more than about 65% of the number of original acetate groups in the original poly(vinyl acetate) has been replaced by aldehyde groups.

Mixing of the ingredients to form the composition of the present invention may be carried out in any of the known mixing devices such as a mill or Banbury mixer. Mixing and blending should be carried out at a temperature sufficiently low that significant vulcanization or curing of the rubber will not take place during the mixing operation. Generally, temperatures lower than about 240° F. should be used during blending. Blending seldom takes longer than 5–25 minutes.

The rubber and the acetal may be blended along with any plasticizer to be used such as tricresyl phosphate, dioctyl phthalate, butyl octyl phthalate, and butyl benzyl phthalate. The plasticizers to be used are known plasticizers for chlorosulfonated polythylene rubber. Stabilizers and lubricants will often be incorporated. These stabilizers may include metallic oxides such as magnesium oxide and lead oxide, and epoxidized compounds such as epoxidized soya bean oil, which may also serve as a plasticizer. Lubricants and plasticizers such as calcium stearate and other long-chain fatty acid derivatives, chlorinated hydrocarbons, and other known lubricants may be used to aid the processing and mixing operations. The lubricants generally are added in an amount sufficient to impart good processing properties to the mixture and will most generally be added in the range of about 2–50 parts by weight per 100 parts by weight of the rubber. Additional resins may be incorporated in small amounts to impart additional strength if such is required. As examples of such resins there may be mentioned polyethylene, rosin, phenol-formaldehyde resins, and rosin-modified phenol-formaldehyde resins.

Dyes or pigments can be incorporated into the mix in an amount sufficient to color the composition in any desired manner. The amount of dyes and pigments will generally be less than about 15% by weight of the total mix and most generally will run around 10–12% by weight, including such pigments as titanium dioxide. It will be appreciated that the amount of pigment or dye to be added will be largely dependent on the nature of the pigment or dye. Mixtures of compositions having different colors may be blended in particle or chip form before calendering in order to give a mottled appearance to the resulting floor covering.

Fillers, or mixtures of fillers, will be used in the composition. These fillers are all mineral inorganic fillers such as ground limestone, silica, the clays, asbestos, and the like. The filler is incorporated simply by adding it to the rubber, or the rubber-acetal mixture, in the Banbury mixer or on the mill. The amount of inorganic filler will vary between about 30–85% by weight of the total composition. The addition of the filler will sometimes call for an increase in the amount of plasticizer added to the composition, if any has been used.

The poly(vinyl acetal) should be added to the composition in an amount of 2–20 parts by weight of the acetal per 100 parts by weight of the chlorosulfonated polyethylene rubber. Amounts of the acetal less than 2 parts per 100 parts of the rubber do not sufficiently modify the surface characteristics of the finished floor covering to yield significant improvement in soil resistance. On the other hand, amounts of the poly(vinyl acetal) greater than 20 parts by weight per 100 parts by weight of the rubber unduly stiffen and harden the flooring composition, even in the presence of additional plasticizer. The preferred amount is about 8–12 parts by weight of the acetal per 100 parts by weight of the rubber.

The metallic oxides will be used. Magnesium oxide is a curing agent for the chlorosulfonated polyethylene rubber and will generally be used in an amount of about 10–30 parts by weight MgO per 100 parts by weight of the rubber. Additional magnesium oxide will serve as an acid acceptor in the event of any decomposition of the chlorosurfonated polyethylene under the action of light or heat. Magnesium oxide can also serve as a straight filler. Metallic oxides such as titanium dioxine may comprise part of the pigment system of the composition. The usual rubber accelerators may be used to increase the rate of cure of the composition during vulcanization.

After being thoroughly mixed in a suitable mixer, the flooring composition is then sheeted by placing the composition in a calender or other suitable sheet-forming device. The resulting sheet may be laminated to a backing, with or without the aid of an adhesive. Alternatively, the sheet may be cut into tiles by the customary procedures for tile manufacture. Individual molds and presses for individual tiles may be used if it is desirable to form tile of special sizes and shapes.

Curing or vulcanization or cross-linking of the flooring composition is carried out by subjecting the sheets or tiles to elevated temperatures in the range of 180–400° F. for a period of time of from 0.25–90 minutes, longer times being used at lower temperatures. Vulcanization may be carried out in suitable air-circulating ovens or stoves or by subjecting the sheets or tiles to heat on a moving carrier in a manner similar to that in which polyvinyl resins are fused in the manufacture of floor coverings. Heating and curing may be carried out in suitable presses at pressure ranges of about 1,000–3,000 pounds per square inch at the above-stated temperatures. Where low-temperature stoves are used, cure times may run for a week or so.

After cure is complete, the resulting product may be cooled and then lacquered, waxed, or otherwise treated in accordance with standard finishing processes in the surface covering industry. In view of the excellent soil resistance of the product, however, it is not essential that the product be subsequently treated in such manner.

The flooring composition of the present invention will generally utilize the following ingredients in approximately the ranges stated:

| Ingredients: | Percentage by weight |
|---|---|
| Chlorosulfonated polyethylene rubber | 15–70 |
| Poly(vinyl acetal) | 0.3–28.5 |
| Inorganic fillers | 30–85 |
| Pigments | 0–15 |
| Stabilizers and lubricants | 0–5 |
| Plasticizers | 0–10 |
| Curing agents | 0–10 |

The following examples illustrate several embodiments of the invention. All parts are by weight unless otherwise stated.

*Example 1*

The following ingredients were thoroughly blended on a rubber mill at a temperature in the range of 100–250° F.

| Ingredients: | Parts |
|---|---|
| Chlorosulfonated polyethylene rubber (a 75:25 mixture of Hypalon 30:Hypalon 20) | 100 |
| Poly(vinyl formal) (Formvar 7/70) | 10 |
| Hydrogenated wood rosin (Stabelite resin) | 5 |
| Magnesium oxide | 20 |
| Calcium stearate | 2 |
| Benzothiazyl disulfide (Altax) | 2 |
| Triphenyl phosphite | 10 |
| Clay (Snobrite clay) | 150 |
| Calcium carbonate | 125 |
| Titanium dioxide | 50 |

The rubber went on the mill first, followed by the wood rosin, and the formal. After milling at 230° F. for about 10 minutes there was then added the filler, the lubricant, the plasticizer, curing agent, and accelerator; these were added to the rubber mixture with full cooling on the mill.

The poly(vinyl formal) resin was derived from a poly(vinyl acetate) resin which had a viscosity of 7 centipoises taken in a benzene solution containing 86 grams per liter. The aldehyde groups replaced 90% of the acetate groups in the poly(vinyl acetate). These values are all nominal.

After thorough blending, the composition was sheeted on a calender, cut into tiles, cured in an oven for 10 minutes at 327° F., and cooled.

Test installations of the resulting tile against control tile made without the poly(vinyl formal) resin and against a high-quality, non-staining, soil-resistant, commercial plastic tile, showed that the tile made above resisted staining and soiling at least as well as the commercial tile. The control chlorosulfonated polyethylene tile quickly soiled very badly, and the stain and soil were difficult to remove save by actually abrading the surface of the tile. The tensile strength, abrasion resistance, flexibility, color, thermal stability, bend-break angle, and indentation were all at least as good and in some instances better in the tile prepared as described above as compared with the chlorosulfonated polyethylene rubber tile made in the absence of the poly(vinyl formal).

Example 2

A series of four compositions was made to determine the effects of increasing amounts of poly(vinyl acetal) resin on the rubber binder. Following are the formulations:

| Ingredients | Parts (1) | Parts (2) | Parts (3) | Parts (4) |
|---|---|---|---|---|
| Chlorosulfonated polyethylene rubber (Hypalon 30) | 100 | 100 | 100 | 100 |
| Poly(vinyl butyral) resin (Butvar B-76) | 20 | 15 | 10 | 5 |
| Hydrogenated wood rosin (Stabelite resin) | 5 | | | |
| Magnesium oxide | 20 | | | |
| Calcium stearate | 2 | | | |
| Benzothiazyl disulfide (Altax) | 2 | | | |
| Tricresyl phosphate | 8 | | | |
| Clay (Snobrite clay) | 150 | 175 | | |
| Calcium carbonate (Cal White) | 125 | 170 | | |
| Titanium dioxide (TiPure R-101) | 50 | 50 | | |

All the compositions were significantly soil-resistant as compared with a control which did not contain the poly(vinyl butyral) resin. This poly(vinyl butyral) resin had a hydroxyl content expressed as percent poly(vinyl alcohol) of 9–13%, an acetate content expressed as percent poly(vinyl acetate) of a maximum of 2.5%, and a butyral content expressed as percent poly(vinyl butyral) of about 88%.

Run 1, containing 20 parts of the poly(vinyl butyral) per 100 parts by weight of the rubber, was the least flexible of the four runs and approached the limit of permissible stiffness for a flooring tile. Although additional plasticizers could be added to impart increased flexibility, such addition of plasticizers reduces the abrasion resistance of the tile and hence is undesirable.

I claim:

1. A flexible, soil-resistant floor covering comprising a cured, pigmented and plasticized composition containing 30–85% by weight inorganic fillers and 70–15% by weight of a binder system including chlorosulfonated polyethylene rubber and poly(vinyl acetal) curing agent in an amount of 2–20 parts by weight of said acetal per 100 parts by weight of said rubber.

2. A floor covering according to claim 1 wherein said poly(vinyl acetal) comprises a poly(vinyl formal).

3. A floor covering according to claim 1 wherein said poly(vinyl acetal) comprises a poly(vinyl butyral).

4. A floor covering according to claim 1 wherein said poly(vinyl acetal) is present in an amount of 8–12 parts by weight per 100 parts by weight of said rubber.

5. A floor covering according to claim 1 wherein said poly(vinyl acetal) is present in an amount of 10 parts by weight per 100 parts by weight of said rubber.

6. A floor covering composition according to claim 1 containing magnesium oxide as a curing agent.

7. A floor covering according to claim 1 wherein said poly(vinyl acetal) is derived from a poly(vinyl acetate) in which at least 65% of the acetate groups are replaced by aldehyde groups.

References Cited by the Examiner

UNITED STATES PATENTS

| | | | |
|---|---|---|---|
| 2,693,459 | 11/1954 | Fisk | 260—45.5 |
| 2,956,980 | 10/1960 | Law | 260—45.5 |
| 3,088,929 | 5/1963 | Makowski et al. | 260—41 |

MORRIS LIEBMAN, *Primary Examiner.*